US008456996B2

(12) United States Patent
Bhattacharjee et al.

(10) Patent No.: US 8,456,996 B2
(45) Date of Patent: Jun. 4, 2013

(54) METHOD AND APPARATUS FOR IMPROVED MBMS CAPACITY AND LINK MANAGEMENT THROUGH ROBUST AND PERFORMANCE OPTIMAL SOFT COMBINING

(75) Inventors: Supratik Bhattacharjee, San Diego, CA (US); Rajiv Nambiar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 12/847,002

(22) Filed: Jul. 30, 2010

(65) Prior Publication Data

US 2012/0028633 A1    Feb. 2, 2012

(51) Int. Cl.
*H04L 1/00* (2006.01)
*H04L 7/00* (2006.01)
*H04B 7/212* (2006.01)
*H04J 3/06* (2006.01)

(52) U.S. Cl.
USPC ........... 370/235; 370/324; 370/350; 370/503; 375/355

(58) Field of Classification Search
CPC ... H04L 1/0057; H04L 1/0071; H04W 52/322; H04W 52/327
USPC ................. 370/310–350, 229–240, 503–529; 375/130, 347, 355; 455/67.11, 69, 101, 437–438, 450, 456.3, 455/503–504, 522
See application file for complete search history.

(56) References Cited

U.S. PATENT DOCUMENTS

| | | | | |
|---|---|---|---|---|
| 6,807,161 | B2* | 10/2004 | Bender et al. | 370/332 |
| 6,842,445 | B2* | 1/2005 | Ahmavaara et al. | 370/349 |
| 7,583,977 | B2* | 9/2009 | Willenegger et al. | 455/522 |
| 7,593,746 | B2* | 9/2009 | Willenegger et al. | 455/522 |
| 8,107,562 | B2* | 1/2012 | Li | 375/341 |
| 2006/0146745 | A1 | 7/2006 | Cai et al. | |
| 2010/0172279 | A1* | 7/2010 | Chen et al. | 370/312 |
| 2011/0090814 | A1* | 4/2011 | Legg | 370/252 |

FOREIGN PATENT DOCUMENTS

| | | |
|---|---|---|
| EP | 1677442 A1 | 7/2006 |
| EP | 1708413 A1 | 10/2006 |
| EP | 2086205 A1 | 8/2009 |
| GB | 2423894 A | 9/2006 |
| WO | WO2005036917 | 4/2005 |
| WO | WO2006137592 A1 | 12/2006 |

OTHER PUBLICATIONS

International Search Report and Written Opinion—PCT/US2011/045998—ISA/EPO—Jan. 13, 2012.
Partial International Search Report—PCT/US2011/045998, International Search Authority—European Patent Office—Oct. 10, 2011.

* cited by examiner

*Primary Examiner* — Tri H Phan
(74) *Attorney, Agent, or Firm* — Jeffrey D. Jacobs

(57) ABSTRACT

A method for wireless communication is disclosed that includes receiving a plurality of sets of transport blocks, each set of transport blocks associated with a radio link from a plurality of radio links in soft combining; performing a filtering operation of block errors in the plurality of radio links; and removing one or more radio links from the plurality of radio links in soft combining based on the filtering operation. An apparatus and processing system for performing the method are also disclosed.

35 Claims, 13 Drawing Sheets

1302 MODULE FOR RECEIVING A PLURALITY OF SETS OF TRANSPORT BLOCKS, EACH SET OF TRANSPORT BLOCKS ASSOCIATED WITH A RADIO LINK FROM A PLURALITY OF RADIO LINKS IN SOFT COMBINING

1304 MODULE FOR PERFORMING A FILTERING OPERATION OF BLOCK ERRORS IN THE PLURALITY OF RADIO LINKS

1306 MODULE FOR REMOVING ONE OR MORE RADIO LINKS FROM THE PLURALITY OF RADIO LINKS IN SOFT COMBINING BASED ON THE FILTERING OPERATION

METHOD AND APPARATUS FOR IMPROVED MBMS CAPACITY AND LINK MANAGEMENT THROUGH ROBUST AND PERFORMANCE OPTIMAL SOFT COMBINING

BACKGROUND

I. Field

The following description relates generally to communication systems, and more particularly to a method and apparatus for soft symbol determination.

II. Background

Multimedia Broadcast and Multicast Services (MBMS) is a broadcasting service offered via existing cellular network technologies, including Global System for Mobile Communications (GSM), and Universal Mobile Telecommunications System (UMTS), a third generation (3G) mobile phone technology supported by the 3rd Generation Partnership Project (3GPP) and successor to GSM. The infrastructure offers an option to use an uplink channel for interaction between the service and the user, which is not a straightforward issue in usual broadcast networks, as for example conventional digital television is only a one-way (unidirectional) system. MBMS uses multicast distribution in the core network, instead of point-to-point links for each end device.

In MBMS, there may be more than one base station providing the same service, and their signals are often combined to more reliably recover the broadcasted information. There are two types of combining that are possible pursuant to the 3GPP standard. The first, referred to as soft combining, occurs at the physical layer, signaling level. The gains achieved from this approach are higher than the second approach. However, this approach also requires accurate knowledge of the delays between various Base Stations. Incorrect delay information may severely degrade the performance to the extent that soft combining will provide more negative results over no combining.

In addition to the soft combining approach, a second approach of signal combination, referred to as selection combining, happens at the Radio Link Control (RLC) layer level. This combining approach does not require delay information about the base stations. Hence, it is immune to in-accurate delay information. However, the gains achieved from this type of combining are not as significant as compared to soft combining.

Although soft combining provides better results than selection combining, effective soft combining poses several challenges, including: ensuring robustness to network synchronization issues; optimal data path combining in the absence of dedicated pilot bits; and optimal data transport format detection over multiple links each possibly using a different transport format.

Consequently, it would be desirable to address some of the issues noted above.

SUMMARY

The following presents a simplified summary of one or more aspects of a method and apparatus for soft combining in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to apparatus and methods that provide wireless communications, where a method for wireless communications includes receiving a plurality of sets of transport blocks, each set of transport blocks associated with a radio link from a plurality of radio links in soft combining; performing a filtering operation of block errors in the plurality of radio links; and removing one or more radio links from the plurality of radio links in soft combining based on the filtering operation.

In another aspect, an apparatus for wireless communications is provided that includes means for receiving a plurality of sets of transport blocks, each set of transport blocks associated with a radio link from a plurality of radio links in soft combining; means for performing a filtering operation of block errors in the plurality of radio links; and means for removing one or more radio links from the plurality of radio links in soft combining based on the filtering operation.

In yet another aspect, an apparatus for wireless communications is provided that includes a memory comprising a plurality of instructions; a processor coupled to the memory and configured to execute the plurality of instructions to receive a plurality of sets of transport blocks, each set of transport blocks associated with a radio link from a plurality of radio links in soft combining; perform a filtering operation of block errors in the plurality of radio links; and remove one or more radio links from the plurality of radio links in soft combining based on the filtering operation.

In yet another aspect, a computer-program product for wireless communications is provided that includes a computer-readable medium including code for receiving a plurality of sets of transport blocks, each set of transport blocks associated with a radio link from a plurality of radio links in soft combining; performing a filtering operation of block errors in the plurality of radio links; and removing one or more radio links from the plurality of radio links in soft combining based on the filtering operation.

In yet another aspect, an access terminal is provided that includes a receiver; and a processing system coupled to the receiver to receive transport blocks and configured to receive a plurality of sets of transport blocks, each set of transport blocks associated with a radio link from a plurality of radio links in soft combining; perform a filtering operation of block errors in the plurality of radio links; and remove one or more radio links from the plurality of radio links in soft combining based on the filtering operation.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 13 is a block diagram illustrating the functionality of an apparatus for soft symbol determination in accordance with one aspect of the disclosure.

DESCRIPTION

Figure 1:
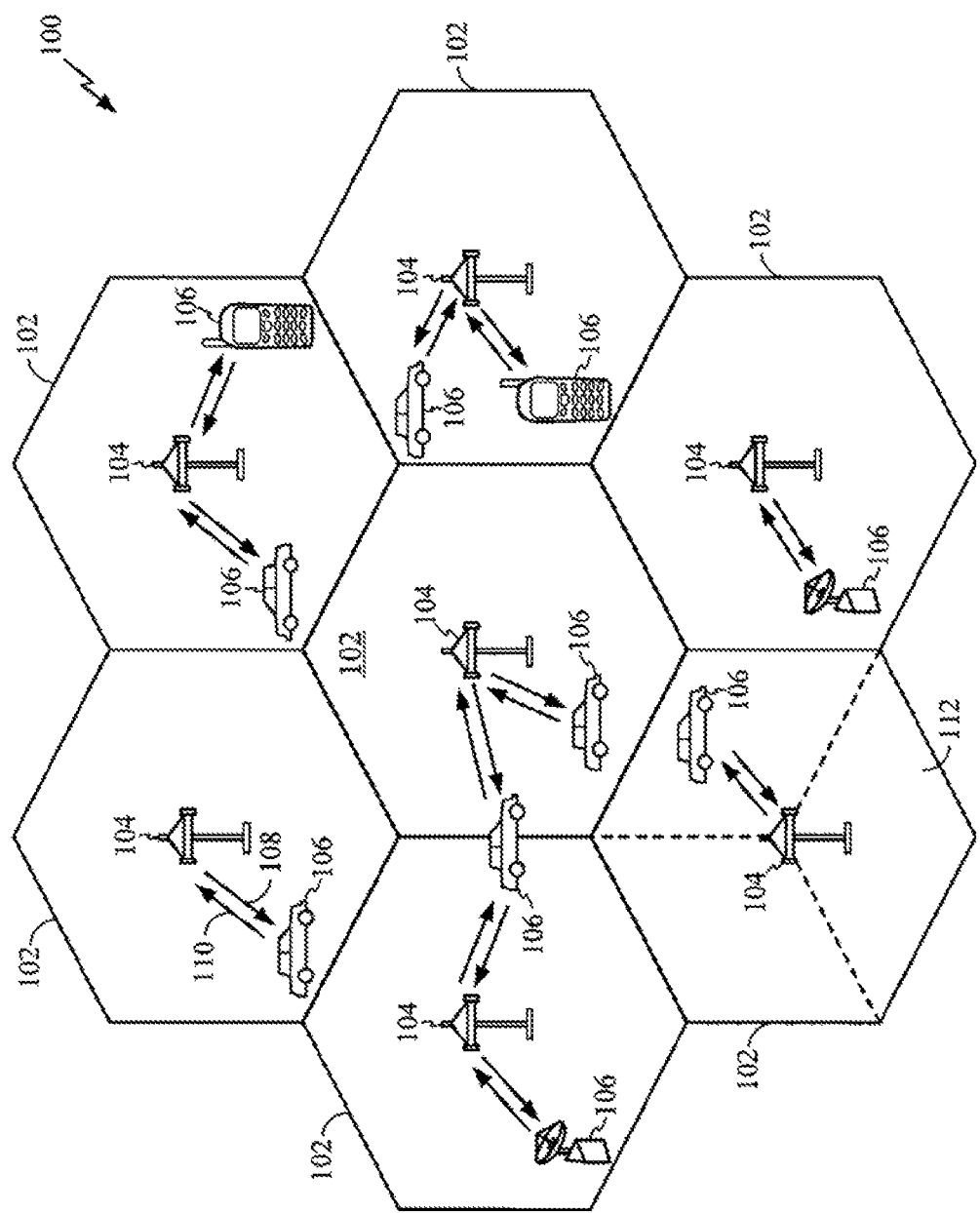
FIG. 1 illustrates an example wireless communication system, in accordance with certain aspects of the present disclosure.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and other variants of CDMA such as TD-SCDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). 3GPP Long Term Evolution (LTE) and LTE-Advanced (LTE-A) in both FDD and TDD modes are new releases of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2), which includes High Speed Packet Access (HSPA). These various radio technologies and standards are known in the art. For clarity, certain aspects of the techniques are described below for 3GPP, and 3GPP terminology is used in much of the description below.

The teachings herein may be incorporated into (e.g., implemented within or performed by) a variety of wired or wireless apparatuses (e.g., nodes). In some aspects, a node implemented in accordance with the teachings herein may comprise a base station or a mobile equipment.

A base station may comprise, be implemented as, or known as an Access Point (AP), a NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

A User Equipment (UE) may comprise, be implemented as, or known as an Access Terminal (AT), a subscriber station, a subscriber unit, a mobile station, a remote station, a remote terminal, a user terminal, a user agent, a user device, a Mobile Equipment (ME), or some other terminology. In some implementations a UE may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates an example of a wireless communication system 100 in which aspects of the present disclosure may be employed. The wireless communication system 100 may be a broadband wireless communication system. The wireless communication system 100 may provide communication for a number of cells 102, each of which is serviced by a base station 104. A particular cell 102 may be divided into multiple sectors 112. A particular sector 112 is a physical coverage area within a particular cell 102. Each base stations 104 may be a fixed station that communicates with one or more UEs 106. The various UEs 106 are dispersed throughout the system 100. Although referred to as "mobile", a particular UE 106 may be fixed (i.e., stationary) or mobile. In many cases, each UE 106 may be able to receive data transmissions from one or more base stations. For example, a UE that is located near the cell boundary of two cells, each served by a different base station, should be able to receive signals from both base stations.

A variety of algorithms and methods may be used for transmissions in the wireless communication system 100 between the base stations 104 and the UEs 106. For example, signals may be sent and received between the base stations 104 and the UEs 106 in accordance with OFDM/OFDMA techniques. If this is the case, the wireless communication system 100 may be referred to as an OFDM/OFDMA system. Alternatively, signals may be sent and received between the base stations 104 and the UEs 106 in accordance with CDMA technique. If this is the case, the wireless communication system 100 may be referred to as a CDMA system.

A communication link that facilitates transmission from a particular base station 104 to a particular UE 106 may be referred to as a downlink, and a communication link that facilitates transmission from a particular UE 106 to a particular base station 104 may be referred to as an uplink. Alternatively, a downlink may be referred to as a forward link or a forward channel, and an uplink may be referred to as a reverse link or a reverse channel.

Figure 2:
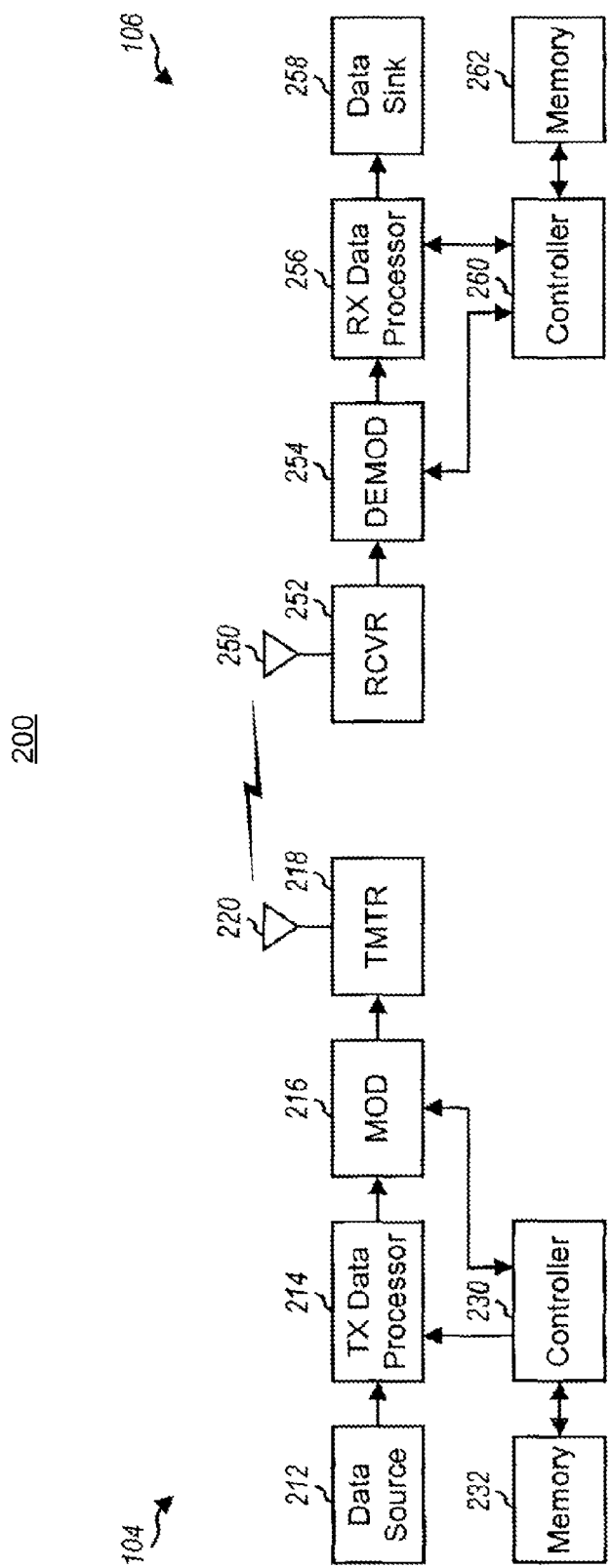
FIG. 2 illustrates various components that may be utilized in a wireless device in accordance with certain aspects of the present disclosure.

FIG. 2 is a simplified block diagram of an embodiment of a base station 104 and a UE 106. On the downlink, at base station 104, a transmit (TX) data processor 214 receives different types of traffic such as user-specific data and data for MBMS services from a data source 212, messages from a controller 230, and so on. TX data processor 214 then formats and codes the data and messages based on one or more coding schemes to provide coded data.

The coded data is then provided to a modulator (MOD) 216 and further processed to generate modulated data. For W-CDMA, the processing by modulator 216 includes (1) "spreading" the coded data with orthogonal variable spreading factor (OVSF) codes to channelize the user-specific data, MBMS data, and messages onto physical channels and (2) "scrambling" the channelized data with scrambling codes. The modulated data is then provided to a transmitter (TMTR) 218 and conditioned (e.g., converted to one or more analog signals, amplified, filtered, and quadrature modulated) to generate a downlink modulated signal suitable for transmission via an antenna 220 over a wireless communication channel to the terminals.

At terminal 106, the downlink modulated signal is received by an antenna 250 and provided to a receiver (RCVR) 252. Receiver 252 conditions (e.g., filters, amplifies, and down-converts) the received signal and digitizes the conditioned signal to provide data samples. A demodulator (DEMOD) 254 then receives and processes the data samples to provide recovered symbols. For W-CDMA, the processing by demodulator 254 includes (1) descrambling the data samples with the same scrambling code used by the terminal, (2) despreading the descrambled samples to channelize the received data and messages onto the proper physical channels, and (3) (possibly) coherently demodulating the channelized data with a pilot recovered from the received signal. A receive (RX) data processor 256 then receives and decodes the symbols to recover the user-specific data, MBMS data, and messages transmitted by the base station on the downlink.

Controllers 230 and 260 control the processing at the base station and the terminal, respectively. Each controller may also be designed to implement all or a portion of the process to select transport format combinations for use described herein. Program codes and data required by controllers 230 and 260 may be stored in memories 232 and 262, respectively.

As noted above, one or more UEs 106 may receive data transmissions from multiple base station 104 and combine the received transmissions through soft combining The various soft combining approaches will now be described, with a first approach being a network robust dynamic soft/selection combining approach. This approach allows the UE to dynamically select soft combining based on a detection of the transmissions between various base stations as being out of synchronization with each other. This approach will also attempt to provide that false alarms arising from sudden changes in propagation conditions are kept at a minimum.

Figure 3:
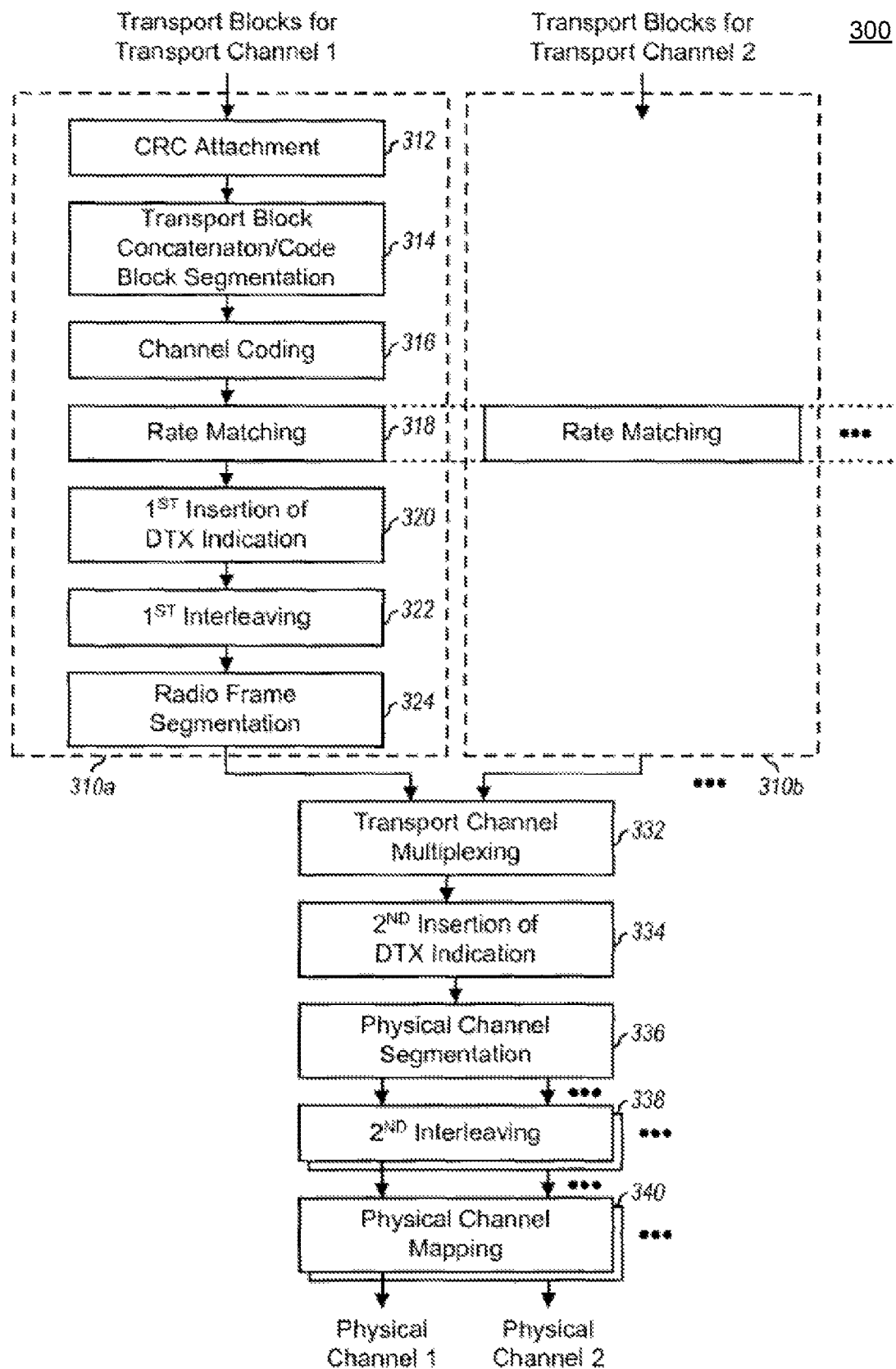
FIG. 3 is a diagram illustrating the signal processing at the base station for a downlink data transmission, in accordance with W-CDMA.

FIG. 3 is a diagram of the signal processing at a base station for a downlink data transmission, in accordance with W-CDMA. The upper signaling layers of a W-CDMA system support data transmission on one or more transport channels to a specific terminal (or for a specific MBMS service). Each transport channel is capable of carrying data for one or more services. These services may include voice, video, packet data, and so on, which are collectively referred to herein as "data". The data to be transmitted is initially processed as one or more transport channels at a higher signaling layer. The transport channels are then mapped to one or more physical channels assigned to the terminal (or MBMS service).

The data for each transport channel is processed based on a transport format (TF) selected for that transport channel (a single TF is selected at any given moment). Each transport format defines various processing parameters such as a transmission time interval (TTI) over which the transport format applies, the size of each transport block of data, the number of transport blocks within each TTI, the coding scheme to be used for the TTI, and so on. The TTI may be specified as 10 msec, 20 msec, 40 msec, or 80 msec. Each TTI may be used to transmit a transport block set having $N.sub.B$ equal-sized transport blocks, as specified by the transport format for the TTI. For each transport channel, the transport format can dynamically change from TTI to TTI, and the set of transport formats that may be used for the transport channel is referred to as the transport format set (TFS).

As shown in FIG. 3, the data for each transport channel is provided, in one or more transport blocks for each TTI, to a respective transport channel processing section 310. Within each processing section 310, each transport block is used to calculate a set of cyclic redundancy check (CRC) bits (block 312). The CRC bits are attached to the transport block and are used at the terminal for block error detection. The one or more CRC coded blocks for each TTI are then serially concatenated together (block 314). If the total number of bits after concatenation is greater than the maximum size of a code block, then the bits are segmented into a number of (equal-sized) code blocks. The maximum code block size is determined by the particular coding scheme (e.g., convolutional, Turbo, or no coding) selected for use for the current TTI, which is specified by the transport channel's transport format for the TTI. Each code block is then coded with the selected coding scheme or not coded at all (block 316) to generate coded bits.

Rate matching is then performed on the coded bits in accordance with a rate-matching attribute assigned by higher signaling layers and specified by the transport format (block 318). On the downlink, unused bit positions are filled with discontinuous transmission (DTX) bits (block 320). The DTX bits indicate when a transmission should be turned off and are not actually transmitted.

The rate-matched bits for each TTI are then interleaved in accordance with a particular interleaving scheme to provide time diversity (block 322). In accordance with the W-CDMA standard, the interleaving is performed over the TTI, which can be selected as 10 msec, 20 msec, 40 msec, or 80 msec. When the selected TTI is longer than 10 msec, the bits within the TTI are segmented and mapped onto consecutive transport channel frames (block 324). Each transport channel frame corresponds to the portion of the TTI that is to be transmitted over a (10 msec) physical channel radio frame period (or simply, a "frame").

In W-CDMA, data to be transmitted to a particular terminal (or a particular MBMS service) is processed as one or more transport channels at a higher signaling layer. The transport channels are then mapped to one or more physical channels assigned to the terminal (or the MBMS service).

The transport channel frames from all active transport channel processing sections 310 are serially multiplexed into a coded composite transport channel (CCTrCH) (block 332). DTX bits may then be inserted into the multiplexed radio frames such that the number of bits to be transmitted matches the number of available bit positions on one or more "physical channels" to be used for the data transmission (block 334). If more than one physical channel is used, then the bits are segmented among the physical channels (block 336). The bits in each frame for each physical channel are then further interleaved to provide additional time diversity (block 338). The interleaved bits are then mapped to the data portions of their respective physical channels (block 340). The subsequent signal processing to generate a modulated signal suitable for transmission from the base station to the terminal is known in the art and not described herein.

Figure 4:
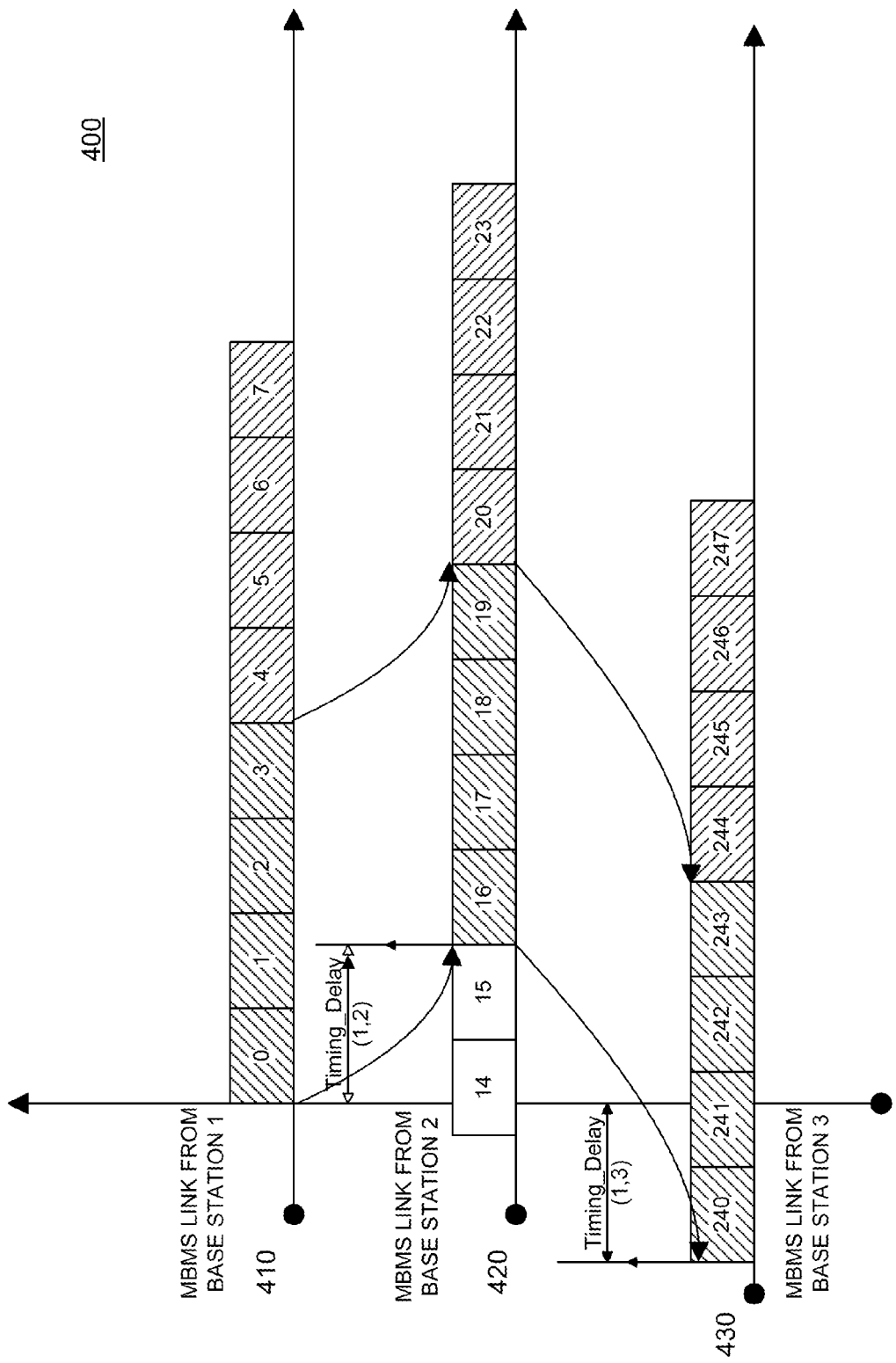
FIG. 4 is a timing diagram illustrating transmissions of a plurality of links from a plurality of base stations that may be soft combined.

FIG. 4 illustrates a timing diagram 400 of how MBMS information from three base stations 1, 2 and 3 are soft combined. The data transmissions, which are composed of sequential frames, are shown over three timelines 410, 420 and 430, where Timing_Delay(1,2) is the delay of data transmission between base stations 1 and 2, while Timing_Delay (1,3) is the delay of data transmission between base stations 1 and 3. Similarly cross-hatched frames illustrate how the same information is transmitted across multiple base stations. For example, frames 0-3 from base station 1; frames 16-19 from base station 2; and frames 240-243 from base station 3 contain the same information. Similarly, frames 4-7 from base station 1; frames 20-23 from base station 2; and frames 244-247 from base station 3 contain the same information.

Figure 5:
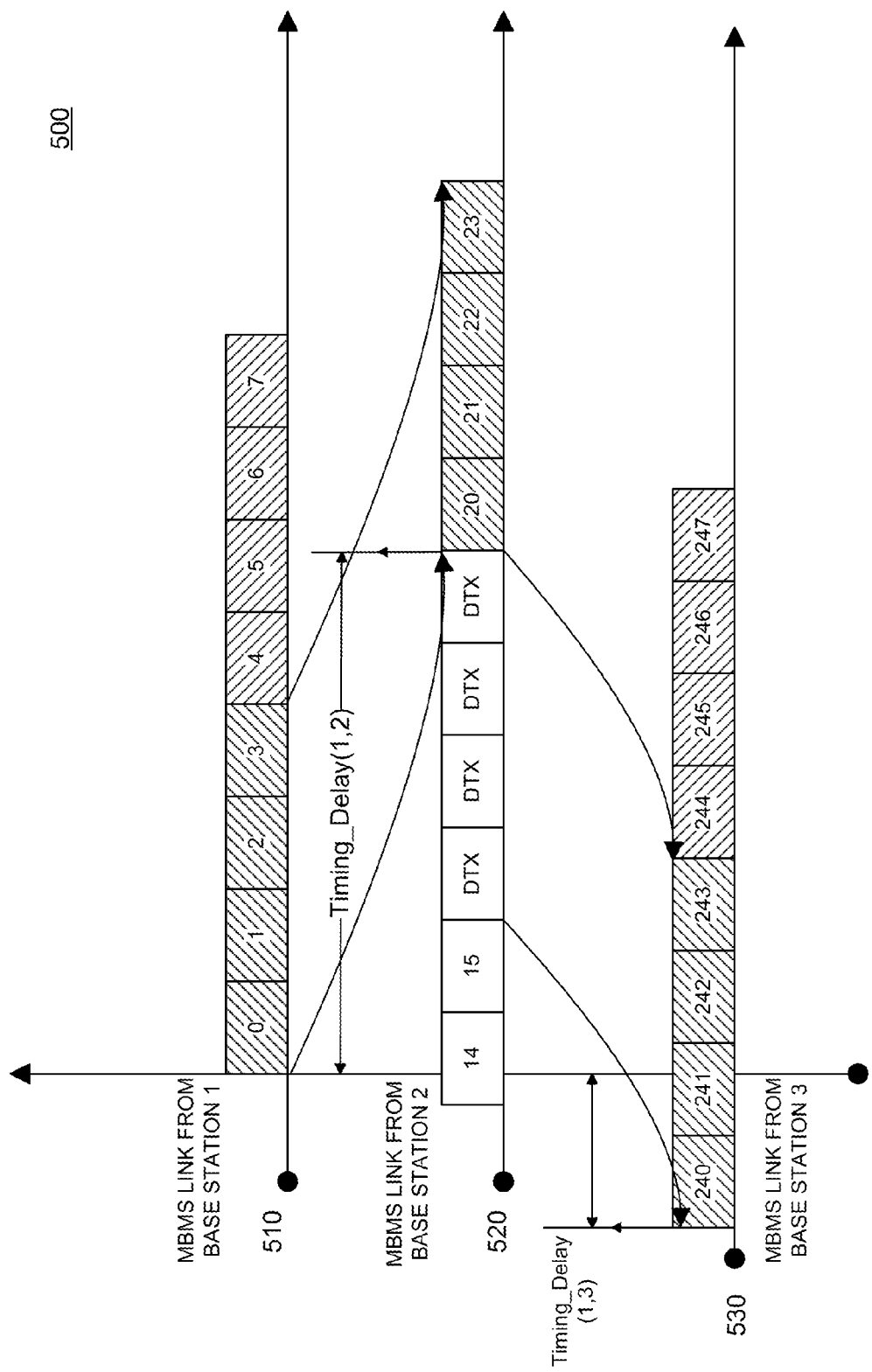
FIG. 5 is a second timing diagram illustrating transmissions of a plurality of links from a plurality of base stations where soft combining is not desirable.

Sometimes due to traffic congestion such as delays at the back-end, the relative timing between base stations may change and neither the UE nor the network has knowledge about this. One such instance is illustrated in a second timing diagram 500 of FIG. 5, where MBMS information from the three base stations 1, 2 and 3 may not be soft combined. The data transmissions, which are composed of sequential frames, are shown over three timelines 510, 520 and 530, where Timing_Delay(1,2) is the delay of data transmission between base stations 1 and 2, while Timing_Delay(1,3) is the delay of data transmission between base stations 1 and 3. Similarly cross-hatched frames illustrate how the same information is transmitted across multiple base stations. For example, frames 0-3 from base station 1; frames 20-23 from base station 2; and frames 240-243 from base station 3 contain the same information. Similarly, frames 4-7 from base station 1; and frames 244-247 from base station 3 contain the same information. Here, base station 2 does not receive the data to be transmitted on time for the next Transmission Time Interval (TTI) and hence engages in a Discontinuous Transmission (DTX) mode during the TTI. The receiving UE has no way of detecting that the timing between the base stations has changed and that the links are out of synchronization, until the serving base station signals this changed timing back to the UE. During this time, soft combining would result in very high decode errors because the UE will try to soft combine the data from all three base stations, even though there will be no data transmitted from base station 2 until a later TTI, when it attempts a retransmission.

When the links are out of synchronization, it is preferable that soft combining is disabled. In one approach, various aspects of an approach to detect when such a scenario occurs and appropriate preventive measures to maintain MBMS performance at the UE are now disclosed. In one aspect, the approach attempts to detect out of synchronization as quickly as possible and disable soft combining Further, the approach attempts to ensure that false alarms arising due to sudden change in propagation conditions are kept at a minimum.

Figure 6:
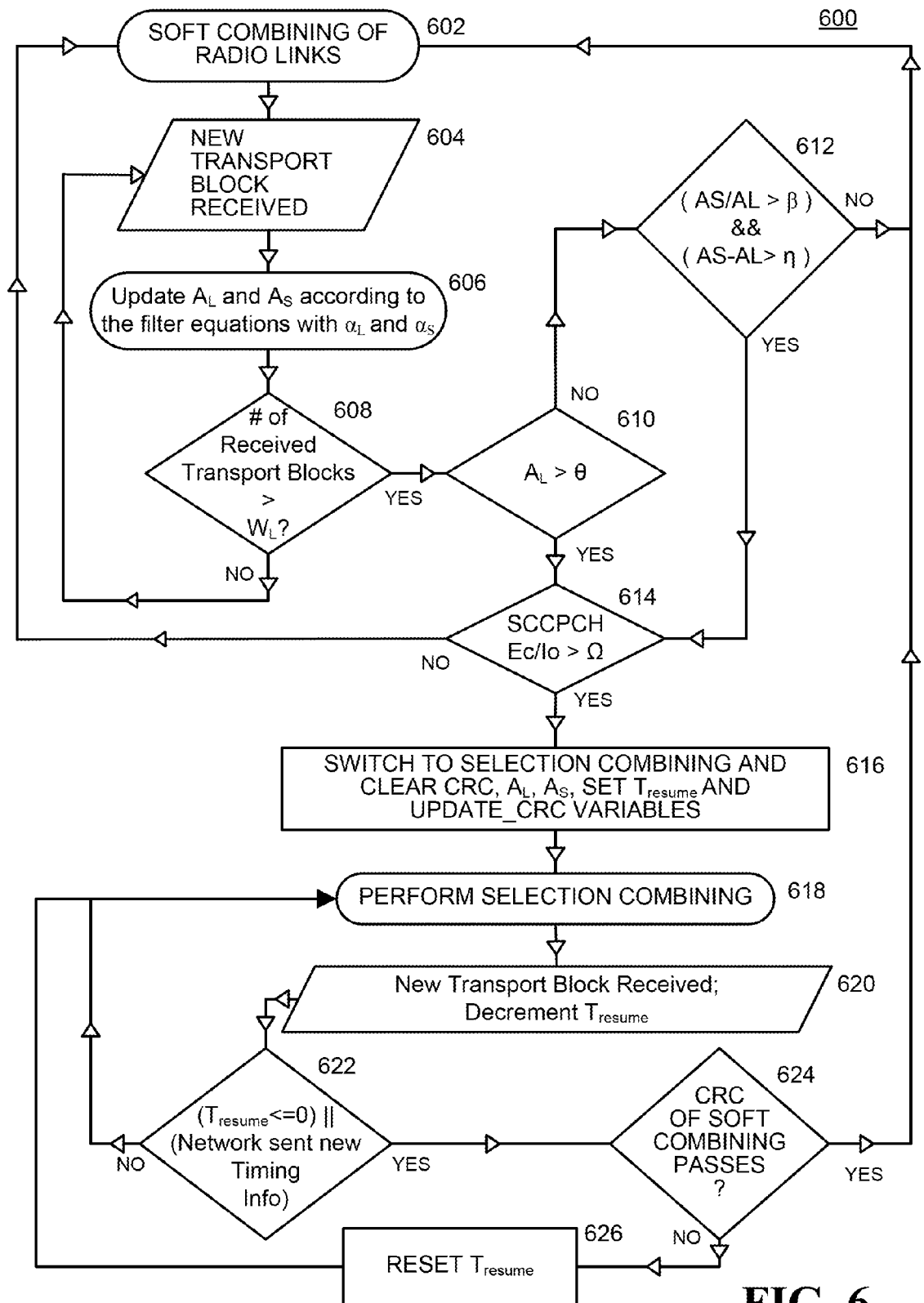
FIG. 6 is a flow diagram of an approach for dynamically choosing between soft combining and selection combining

FIG. 6 illustrates a flow diagram for a selective soft combining approach 600 that includes a synchronization detection approach where, in step 602, a UE operates to soft combine received radio links. Then, in step 604, a new transport block is received. In step 606, a long term average of block errors, designated as $A_L$; and a short term average of block errors, designated as $A_S$, are updated. When an out of synchronization event occurs, the value of $A_S$ is expected to rise to close to 100% as it is the short term average of block errors.

$A_L$ will not be affected significantly for some time as it tracks the long term average of block errors. However, the ratio of short-term to long-term averages may be used as a metric to trigger out of synchronization detection.

Figure 7:
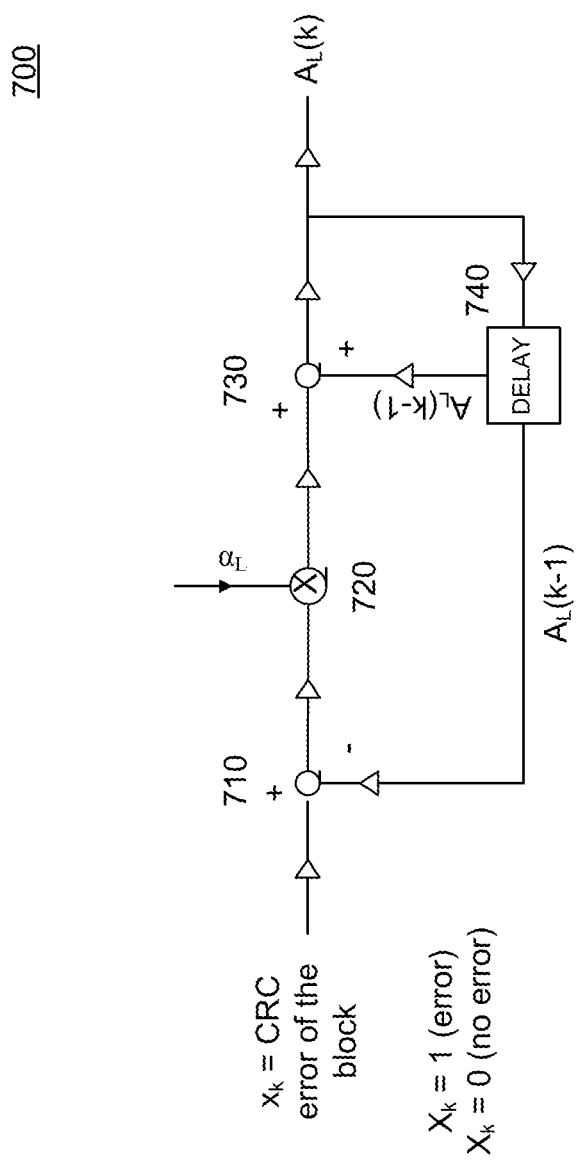
FIG. 7 is a block diagram of a function to determine a long term average of block errors.

In one aspect of the disclosure, $A_L$ is updated through the use of a filter function 700, as illustrated by FIG. 7. As part of the error detection and correction process for block transmission, a cyclic redundancy check (CRC) process is used to detect accidental changes to each block. In the CRC process, a short, fixed-length binary sequence is calculated. This sequence is known as the CRC code or simply CRC. When a block is read or received the device repeats the calculation; if the new CRC does not match the one calculated earlier, then the block contains a data error and the device may take corrective action such as rereading or requesting the block be sent again. Interference cancellation may be then used to remove interference when the CRC passes.

Figure 8:
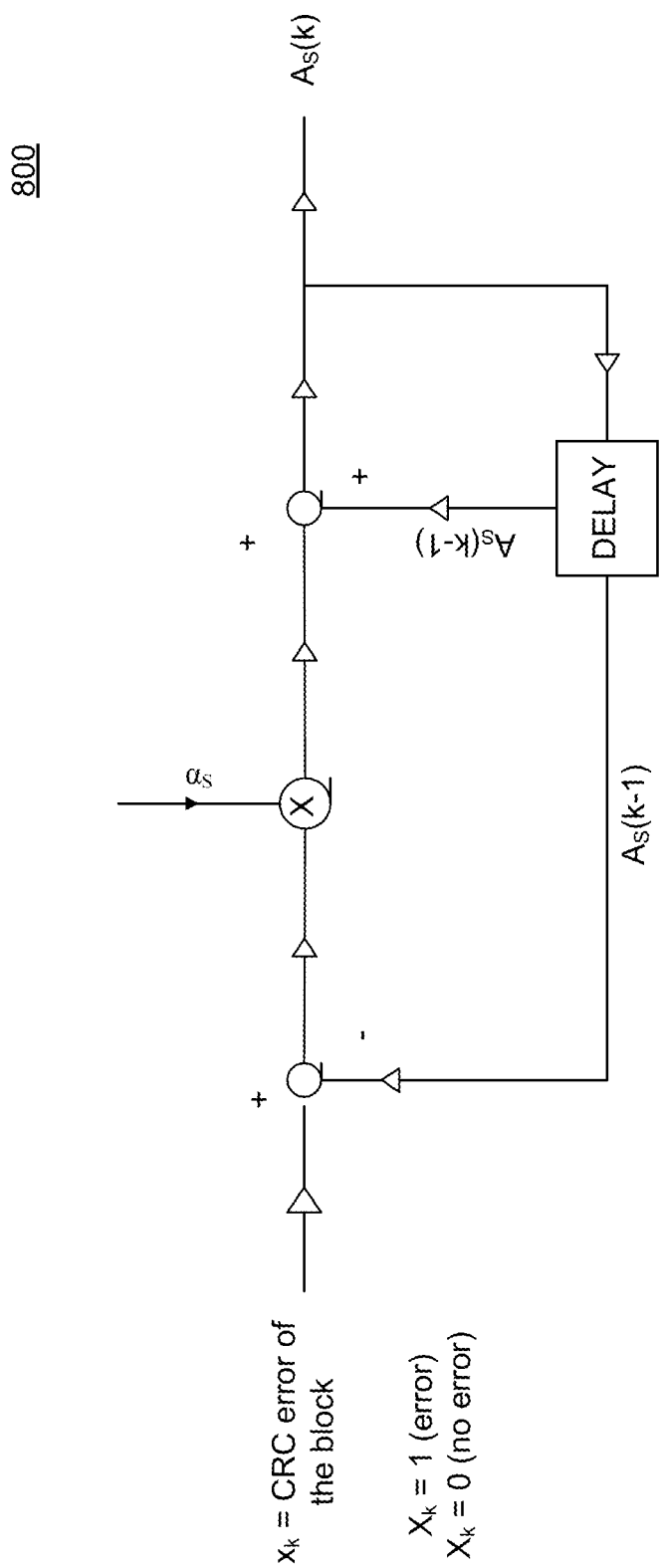
FIG. 8 is a block diagram of a function to determine a short term average of block errors.

In one aspect of the disclosure, the filter function 700 implements an Infinite Impulse Response (IIR) function, with an input of the filter function 700 being the CRC error of a particular block in sequence k, referenced as $X_k$, which is a "1" if there is an error, and a "0" if there is not. $X_k$ is multiplied 720 with a filtering coefficient $\alpha_L$ that weights the result of each CRC determination after the last iteration of $A_L$ has been subtracted 710, referenced as $A_L$ (k-1) in the figure. A delay 740 is used to store the $A_L$ (k-1) value. Then, the output of $A_L$ (k) is the sum of the value of $A_L$ (k-1) and the output of the multiplication 720. In a similar fashion, $A_S$ is updated through the use of a filter function 800, as illustrated by FIG. 8, with all similarly numbered blocks performing the same functions as described in FIG. 7.

In step 608, after the values of $A_L$ and $A_S$ have been updated, it will be determined if the number of received transport blocks has exceeded an initial delay value, represented by WL. This initial delay is used to provide a minimum wait time before the values of $A_L$ and $A_S$ are considered usable for determining whether there exists an out of synchronization condition.

As an initial determination, in case the timing information is incorrect right from the beginning, then both the short term and long term average error values will be high and the ratio of these two values will not be a suitable metric. Because of this, the value of the long term block error rate measurement needs to be investigated. Thus, in step 610, the value of $A_L$ is compared to a threshold value θ. If the value of $A_L$ is less than or equal to the value of θ, then operation continues with step 612, where the values of $A_L$ and $A_S$ are compared to determine if an out of synchronization condition possibly exists, as further described herein. Otherwise, if the value of $A_L$ is greater than the value of θ, then operation continues with step 514, where it is confirmed if an out of synchronization condition exists based on the examination of certain power metrics, as further described herein.

In step 612, if the value of $A_L$ as determined previously in step 610 is not above the value of θ, then the ratio of $A_L$ to $A_S$ is compared to a threshold value of the ratio for switching from soft combining to selective combining, referred to as β. Also, the value of the difference between $A_L$ and $A_S$ is also compared to a threshold value of a delta for switching from soft combining to selective combining, the threshold delta value being referred to as η. In one aspect, both of these conditions have to be met before a final check is made in step 614 to see if the UE should stop using soft combining These two conditions represent the fact that the short term block error rate has exceeded certain parameters, meaning that there is most likely an out of synchronization situation. If both conditions are not met, then operation returns to step 602, where the links will continue to be soft combined.

In step 614, a sudden jump in short term block error rates may also happen due to a sudden change in propagation condition. This would be reflected in the power measured on the MBMS information carrying channels. Hence, to prevent false triggering, the decision to switch away from soft combining in step 612 may be qualified based on a MBMS channel power measurement, as compared to a power threshold, referenced as Ω. In one aspect of the present approach, for example, where the system is implemented in 3GPP, the power information may be obtained from a channel known as the Secondary Common Control Physical Channel (S-CCPCH) as they carry MBMS information. Specifically, a ratio of an average energy per Pseudo-random Noise (PN) chip, referred to as $E_C$, versus a total received power density, including signal and interference, as measured at the UE antenna connector, referred to as $I_O$, is determined. For a UE that is able to simultaneously receive signals from more than one carrier, $I_O$ is defined for each carrier individually.

In step 616, after an out of synchronization condition is detected, soft combining is disabled and the various variables are reset, including the CRC, $A_L$ and $A_S$, and other values used to determine the out of synchronization condition. Further, a timer value, referred to as $T_{resume}$, is set so that selection combining process may be used only for a limited period of time before it is determined if soft combining may be used again. This is because soft combining is preferred.

In step 618, selection combining is performed. Those skilled in the art would know there are multiple ways of approaching selection combining Thus, a discussion of which will not be detailed herein.

In step 620, a new transport block is received, and the value of $T_{resume}$ is decremented. As noted above, the timer is meant to limit the amount of time spent in selective combining mode. In other aspects of the approach, instead of decrementing the counter based on an event such as receipt of a transport block, a mechanism based strictly on time may be used.

In step 622, it is determined if $T_{resume}$ has been expired or the network has sent new timing information. If the former condition has occurred, the timer for selective combining mode has expired, and soft combining may be considered. For the latter, once the network has sent timing information, the UE should have updated synchronization information, and soft combining may also be considered. In either case, operation continues with step 624.

In step 624, a CRC of a soft combining of the links is performed to determine if the various links are now synchronized. If the CRC passes, then operation returns to step 602 where, as previously disclosed, soft combining is used by the UE again. Otherwise, operation continues with step 626.

In step 626, $T_{resume}$, the timer for continuing to perform selective combining is set to resume soft combining after a predetermined count. As discussed herein, the aim of this timer is to provide an escape mechanism and resume soft combining in case detection turns out to be false and soft combining was stopped un-necessarily. In one aspect of the approach, different timers for returning to the mode of soft combining may be used. For example, a separate timer may be used to determine a period of time to try soft combining based on when the network had last sent new timing information may be used regardless of the status of $T_{resume}$. In this case, the UE may be configured to wait a certain period of time and operate in selective combining mode even though the links are synchronized.

Because soft combining inherently uses information across multiple links, each of which may be received at a quality level, it may be beneficial to determine which links are received at a better quality and assume that the information received on those links are more accurate. In one aspect of the soft combining approach, the power of the received link may be used as an indicator of link quality. As discussed, the S-CCPCH power is determined to prevent false triggering of the selection combining process. Thus, weighing each link with a corresponding S-CCPCH power may improve combining of S-CCPCH across multiple cells.

For UMTS, an estimate of the power for the primary data channel is determined for every cell. However, a measure of S-CCPCH power is normally lacking. There are two approaches that are typically used. In the first, the network signals to the UE the S-CCPCH power offset with regard to the Common Pilot CHannel (CPICH) for each cell carrying MBMS information. Alternatively, in addition to, or in lieu of the first approach, the UE may estimate S-CCPCH power using a plurality of dedicated pilot bits. One issue with both approaches is that the signals that are required in the respective approaches are not mandatory to the specification. For example, neither the pilot signals for S-CCPCH nor the signaling of the S-CCPCH power offset are necessitated by the UMTS standard. Thus, compatibility and reliability based on the use of either of these approaches will create issues.

In UMTS, the physical layer multiplexes one or several transport channels onto a coded composite transport channel. Each of the constituent transport channels has associated defined transport formats. However, at any given point of time, not all combinations of transport channels and their associated formats are permitted, hence a subset is defined. A Transport Format Combination (TFC) is one of the subsets that identify the transport channels with their chosen format, and that will make up the coded composite transport channel. The TFC Indicator (TFCI) is a representation of the current TFC being used. The TFCI is transferred across the air interface and allows the receiving layers to identify the current valid TFC and hence, how to decode, de-multiplex and deliver the received data on the appropriate transport channels.

Figure 9:
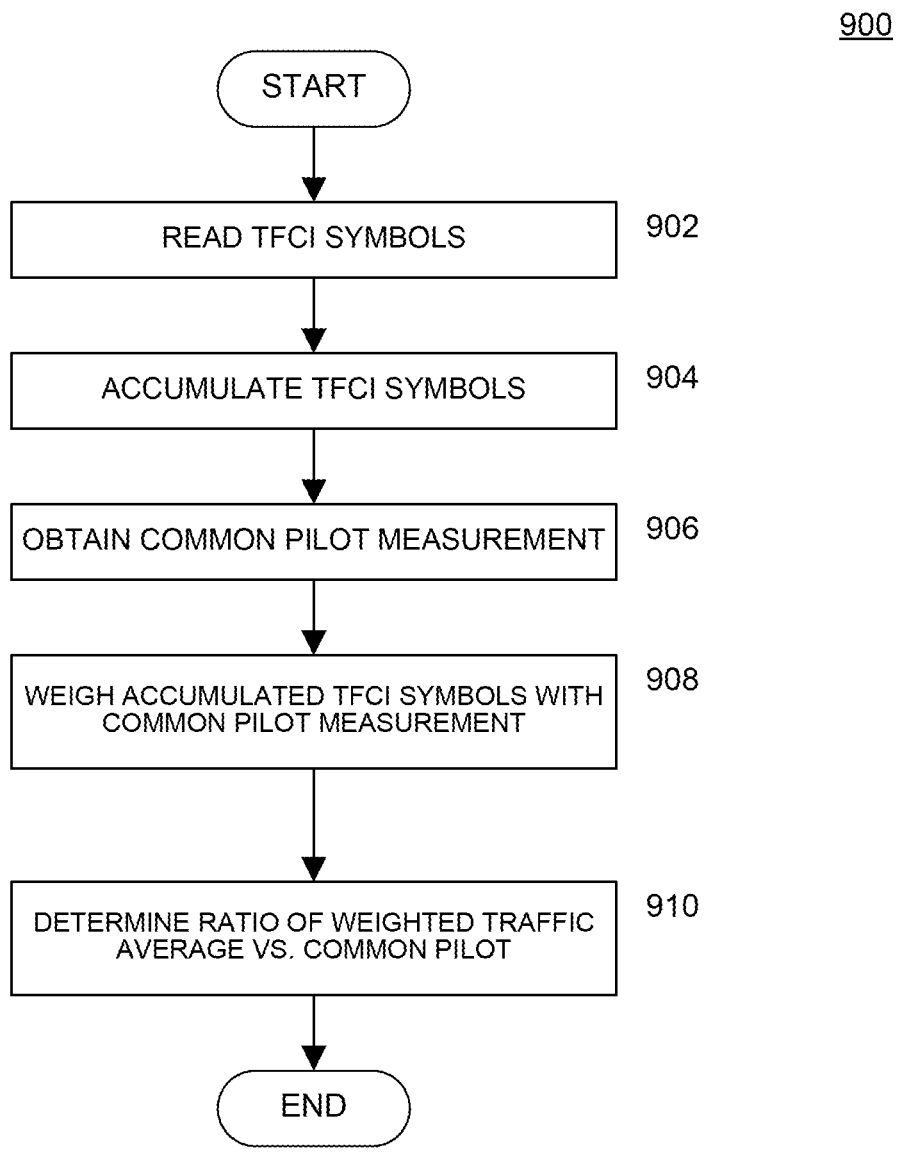
FIG. 9 is a flow diagram of an approach for estimating energy of each link to be soft combined.

The bits used to communicate TFCI are present in all formats used for MBMS. Hence, in one aspect of the approach of soft combining, the TFCI bits may be used for S-CCPCH power estimation. FIG. 9 illustrates a process for estimating S-CCPCH power.

In step 902, received TFCI symbols are read from the memory of the UE. In one aspect of the disclosed approach, these are the encoded symbols as transmitted per slot.

In step 904, the TFCI symbols are accumulated over the slot. In one aspect of the disclosed approach, the accumulation is non-coherent as the UE does not have knowledge of the TFCI that is sent on the frame. In another aspect, if the TFCI that is sent is known, then accumulation of the TFCI may be done coherently. This accumulation may be used to estimate the power.

In step 906, a power measurement for the CPICH is obtained. As noted, the power measurement for the CPICH is provided by the network.

Figure 10:
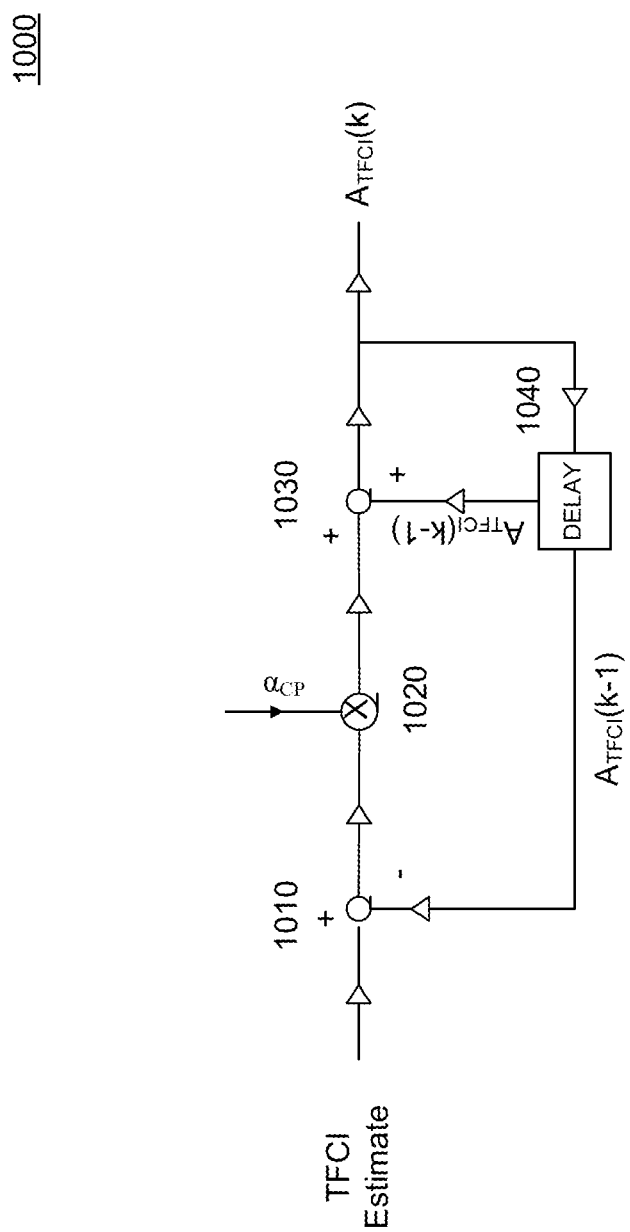
FIG. 10 is a block diagram of a function to determine a weighted average of power for traffic.

In step 908, the accumulated TFCI symbols from step 904 is used to provide an estimate of the S-CCPCH power. In one aspect of the measurement, as illustrated in FIG. 10, a filter function 1000 implements a first-order IIR function, with an input of the filter function 1000 being based on the TFCI symbols. The input may be multiplied 1020 with a coefficient $\alpha_{TFCI}$ that may be used to adjust the weight of each input after the last iteration of $A_{TFCI}$ has been subtracted 1010, referenced as $A_{TFCI}(k-1)$ in the figure. A delay 1040 is used to store the $A_{TFCI}(k-1)$ value. Then, the output of $A_{TFCI}(k)$ is the sum of the value of $A_{TFCI}(k-1)$ and the output of the multiplication 1020.

In step 910, a ratio of a weighted traffic average of TFCI versus the common pilot channel power will be determined to provide an estimate of the SCCPCH offset with regard to CPICH. It is assumed that the data portion of SCCPCH versus the TFCI portion of the SCCPCH has the same dB offset across all links.

When configured for MBMS with soft combining, while the data field bits can be optimally combined as described earlier, the TFCI field cannot be combined across multiple radio links because the TFCI values, each sent over one of the multiple links, may be different even though they point to the same TFC. As a result, TFCI decoding is significantly impacted by other cell interference and ironically more so in strong multi-cell environments, where S-CCPCH data gets the advantage of soft combining To ensure that TFCI detection does not become the bottleneck for system capacity, there may need an efficient way to determine a common TFCI. In one aspect of the soft combining, a TFCI Correlation output (FHT) is used as a measure of the reliability of the TFCI decision. The FHT output magnitudes are combined across radio links that yield the same TFC decision. A decision on the final TFC is then made based on the TFCI(s) signaled by the radio links that yield the highest value. In one implementation, TFCI decisions need to be made sequentially on each radio link as soon as a radio frame is received, with a ping-pong storage of one radio-frame. Moreover, as the radio frame is read out from WCB, soft combining radio links are added in place of the DRMB. For this reason, once earlier radio link(s) is/are de-rate-matched with an incorrect TFCI, as detected with a more reliable, conflicting TFCI decode from later radio link(s), the incorrect values are overwritten in the DRMB.

Figure 11:
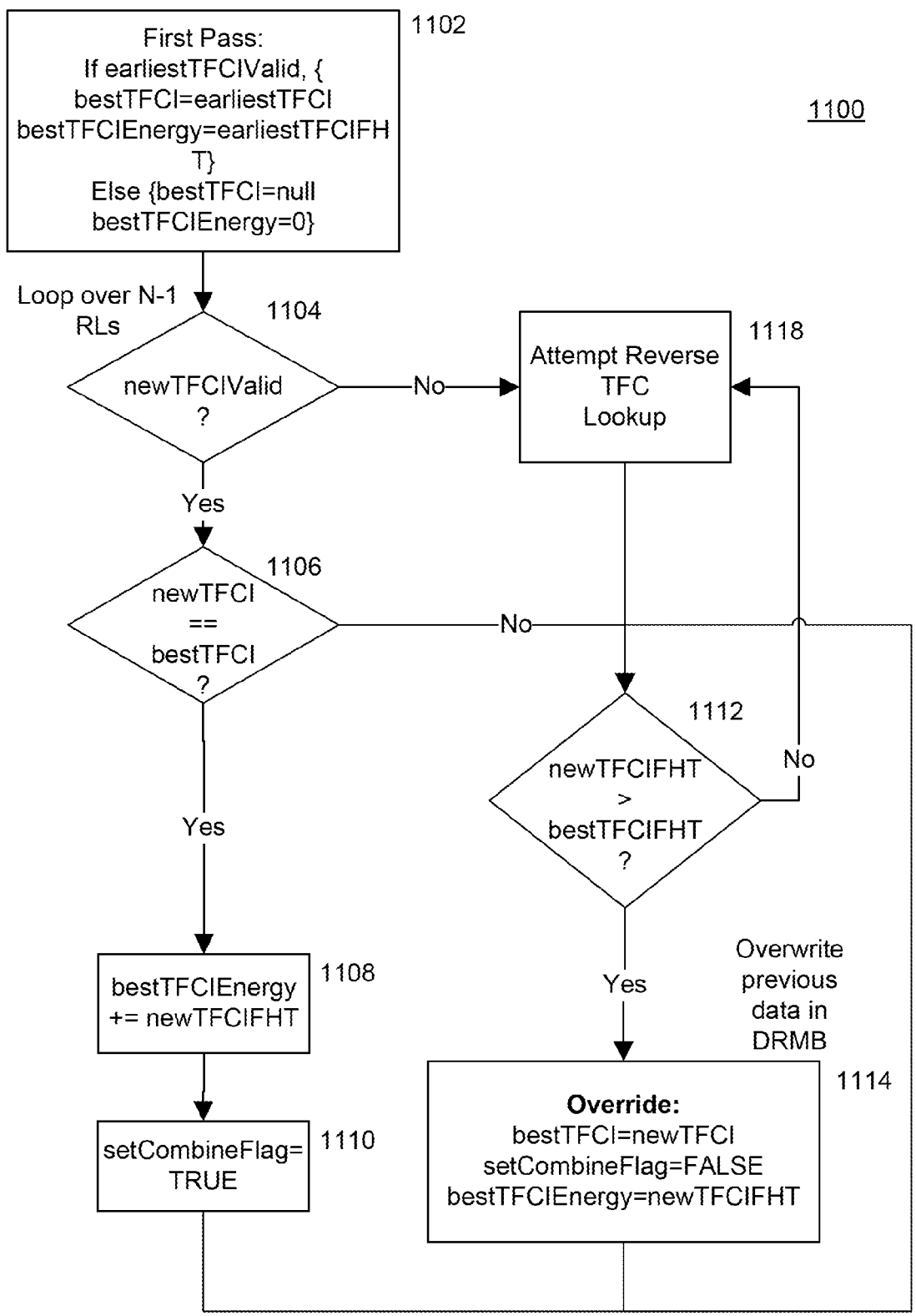
FIG. 11 is a flow diagram of a transport format determination approach used to improve soft combining in accordance with one aspect of the disclosure.

FIG. 11 illustrates a control flow 11 for determining a common TFCI in one aspect. In general, for each radio frame, the TFCI output is used as a tie-breaker in case of conflicting valid TFCI outputs from different radio links. Looking at the consistency of the TFCI information with the current understanding of the TFCI, a decision would be made whether to combine-in-place, or overwrite. In one aspect of the disclosure, a reverse TFC lookup is proposed as a work-around to encountering TFCI decode failures for lagging links. Specifically, in one aspect of the disclosure, if TFCI decode for a lagging link fails, or there is a false decode, then:

1. Use the available candidate TFCIs for that frame to look up the TFC for all the transport channels mapped to the SCCPCH.

2. Perform a reverse lookup on the lagging link that has a TFCI failure to find the corresponding TFCI that matches with the TF combinations (determined by the leading radio link that passed TFCI).

3. Use that TFCI to program the RM parameters for that frame of data for the lagging link.

Thus, instead of throwing away data, the TF combination information and the fact that TF combination has to be the same across all the links to improve overall soft combining performance. If the link that yields a TFCI decode failure is not a lagging link, but if the radio frame is not the first frame within a multi-frame TTI, information from previous frames could be used to determine the TFC.

In step 1102, during initialization, if the earliest TFCI value, earliestTFCI, is valid, as indicated by a flag earliestTFCIValid, then the currently identified value of best TFCI, as stored in a variable bestTFCI, is set to be earliestTFCI. Further, a variable set up to store the best energy value, referred to as bestTFCIEnergy, is set to the energy of the earliest TFCI value. In one aspect of the disclosure, the energy is determined based on a Fast Hadamard Transform (FHT), which is a correlation output of TFCI, and a measure of the realiability of the TFCI. Otherwise, the bestTFCI is set to be a null value, and the bestTFCIEnergy is set to zero.

In step 1104, it is determined if a TFCI candidate retrieved from the current frame is valid, as represented by newTFCIValid. If TFCI decode for a lagging link fails, or there is a false decode, then newTFCIValid will be false, and operation will continue with step 1118. Otherwise, operation continues with step 1106.

In step 1106, it is determined if the new TFCI, represented by the variable newTFCI, is equal to the value in bestTFCI. If so, then the operation continues with step 1108, where the energy of the new TFCI value is added to the best TFCI value. Otherwise, operation continues with step 1112.

In step 1108, a value of the energy of the new TFCI, which is referred to as the newTFCIFHT, is added to the value stored in the bestTFCIEnergy variable.

In step 1110, a combine flag is set to be true, which indicates that the FHT output magnitude is combined as the TFC decision is similar with the other radio link. Then, operation continues with step 1112.

In step 1112, it is determined if the new FHT of the TFCI, as indicated by newTFCIFHT, is greater than the FHT of the TFCI, bestTFCIFHT. Thus, if the correlation value is of the new TFCI is greater than the correlation value of the current best TFCI, then operation continues with step 1114.

In step 1114, the best TFCI, bestTFCI, is set to the new TFCI, newTFCI. In addition, the variable setCombineFlag is set to "FALSE", which means that the setCombineFlag is reset. Further, the variable of bestTFCIEnergy is set to be the value of the newTFCIFHT.

In step 1118, a reverse TFC Lookup is performed. In one aspect of the disclosure, the reverse TFC lookup is proposed as a work-around to encountering TFCI decode failures for lagging links. Specifically, a reverse lookup on the lagging link that has a TFCI failure is performed to find the corresponding TFCI that matches with the TF combinations (determined by the leading radio link that passed TFCI).

In one aspect of the disclosure, the blocks in steps 1104 through 1118 are repeated over the N-1 radio links, as appropriate.

Figure 12:
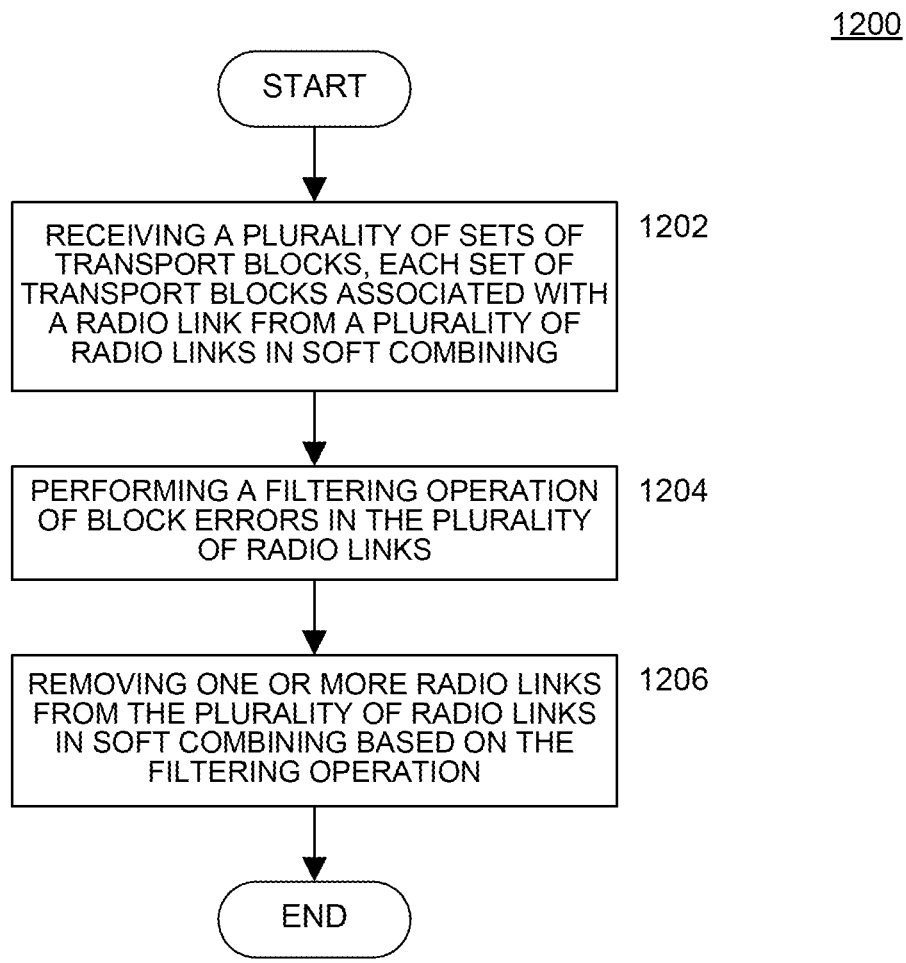
FIG. 12 is a flow diagram of the operation of the communication system.

FIG. 12 illustrates a process 1200 configured in accordance with one aspect of the disclosure for determining a symbol. The process 1200 includes a step 1202 for receiving a plurality of sets of transport blocks, each set of transport blocks associated with a radio link from a plurality of radio links in soft combining Then, in step 1204, perform a filtering operation of block errors in the plurality of radio links. After the filtering operation has been performed, then in step 1206, removing one or more radio links from the plurality of radio links in soft combining based on the filtering operation.

FIG. 13 is a diagram illustrating the functionality of an apparatus 1300 in accordance with one aspect of the disclosure. The apparatus 1300 includes a module 1302 receiving a plurality of sets of transport blocks, each set of transport blocks associated with a radio link from a plurality of radio links in soft combining; a module 1304 for performing a filtering operation of block errors in the plurality of radio links; and a module 1306 for removing one or more radio links from the plurality of radio links in soft combining based on the filtering operation.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of wireless communication, comprising:
   receiving a plurality of sets of transport blocks, each set of transport blocks associated with a radio link from a plurality of radio links in soft combining;
   performing a filtering operation to obtain a measure of block errors detected among the plurality of radio links in soft combining;
   detecting for a lack of synchronization among the plurality of radio links in soft combining based on the measure; and
   disabling soft combining when lack of synchronization is detected.

2. The method of claim 1, further comprising enabling selection combining when lack of synchronization is detected.

3. The method of claim 1, further comprising re-enabling soft combining after a predetermined resume period.

4. The method of claim 1, wherein the measure comprises a long-term average of block errors and performing the filtering operation comprises comparing the measure with an error threshold.

5. The method of claim 1, wherein performing the filtering operation further comprises comparing a power measurement for the plurality of radio links with a power threshold.

6. The method of claim 5, wherein the power measurement comprises a ratio of a weighted average of traffic versus a common pilot.

7. The method of claim 1, wherein performing the filtering operation further comprises determining an S-CCPCH/P-CPICH ratio for use in soft-combining.

8. The method of claim 1, further comprising waiting a start-up delay before performing the filtering operation.

9. The method of claim 1, wherein the soft combining comprises determining a common transport format combination indicator (TFCI).

10. The method of claim 9, wherein determining the common TFCI comprises:
    looking up a transport format combination (TFC) for a plurality of transport channels using an available TFCI candidate for a frame;
    performing a reverse lookup for any lagging links to determine a TFCI corresponding to the TFC; and
    setting radio modulation parameters for the any lagging links based on the determined TFCI.

11. The method of claim 9, wherein the common TFCI is based on a TFCI with a highest amount of correlation from the plurality of radio links.

12. An apparatus for wireless communication, comprising:
    means for receiving a plurality of sets of transport blocks, each set of transport blocks associated with a radio link from a plurality of radio links in soft combining;
    means for performing a filtering operation to obtain a measure of block errors detected among the plurality of radio links in soft combining;
    means for detecting for a lack of synchronization among the plurality of radio links in soft combining based on the measure; and
    means for disabling soft combining when lack of synchronization is detected.

13. The apparatus of claim 12, further comprising means for enabling selection combining when lack of synchronization is detected.

14. The apparatus of claim 12, further comprising means for re-enabling soft combining after a predetermined resume period.

15. The apparatus of claim 12, wherein the measure comprises a long-term average of block errors and the means for performing the filtering operation comprises means for comparing the measure with an error threshold.

16. The apparatus of claim 12, wherein the means for performing the filtering operation comprises means for comparing a power measurement for the plurality of radio links with a power threshold.

17. The apparatus of claim 16, wherein the power measurement comprises a ratio of a weighted average of traffic versus a common pilot.

18. The apparatus of claim 12, wherein the means for performing the filtering operation comprises means for determining an S-CCPCH/P-CPICH ratio for use in soft-combining.

19. The apparatus of claim 12, further comprising means for waiting a start-up delay before performing the filtering operation.

20. The apparatus of claim 12, wherein the soft combining comprises means for determining a common transport format combination indicator (TFCI).

21. The apparatus of claim 20, wherein the means for determining the common TFCI comprises:
means for looking up a transport format combination (TFC) for a plurality of transport channels using an available TFCI candidate for a frame;
means for performing a reverse lookup for any lagging links to determine a TFCI corresponding to the TFC; and
means for setting radio modulation parameters for the any lagging links based on the determined TFCI.

22. The apparatus of claim 20, wherein the common TFCI is based on a TFCI with a highest amount of correlation from the plurality of radio links.

23. An apparatus for wireless communication, comprising:
a memory comprising a plurality of instructions;
a processor coupled to the memory and configured to execute the plurality of instructions to:
receive a plurality of sets of transport blocks, each set of transport blocks associated with a radio link from a plurality of radio links in soft combining;
perform a filtering operation to obtain a measure of block errors detected among the plurality of radio links in soft combining;
detect for a lack of synchronization among the plurality of radio links in soft combining based on the measure; and
disable soft combining when lack of synchronization is detected.

24. The apparatus of claim 23, wherein the processor is further configured to execute the plurality of instructions to enable selection combining when lack of synchronization is detected.

25. The apparatus of claim 23, wherein the processor is further configured to execute the plurality of instructions to re-enable soft combining after a predetermined resume period.

26. The apparatus of claim 23, wherein the measure comprises a long-term average of block errors and the processor is further configured to compare the measure with an error threshold.

27. The apparatus of claim 23, wherein the processor is further configured to compare a power measurement for the plurality of radio links with a power threshold.

28. The apparatus of claim 27, wherein the power measurement comprises a ratio of a weighted average of traffic versus a common pilot.

29. The apparatus of claim 23, wherein the processor is further configured to determine an S-CCPCH/P-CPICH ratio for use in soft-combining.

30. The apparatus of claim 23, wherein the processor is further configured to wait a start-up delay before performing the filtering operation.

31. The apparatus of claim 23, wherein the processor is further configured to determine a common transport format combination indicator (TFCI).

32. The apparatus of claim 31, wherein the common TFCI is based on a TFCI with a highest amount of correlation from the plurality of radio links.

33. The apparatus of claim 23, wherein the processor is further configured to:
look up a transport format combination (TFC) for a plurality of transport channels using an available TFCI candidate for a frame;
perform a reverse lookup for any lagging links to determine a TFCI corresponding to the TFC; and
set radio modulation parameters for the any lagging links based on the determined TFCI.

34. A computer program product for wireless communications, comprising:
a computer-readable medium comprising code for:
receiving a plurality of sets of transport blocks, each set of transport blocks associated with a radio link from a plurality of radio links in soft combining;
performing a filtering operation to obtain a measure of block errors detected among the plurality of radio links in soft combining;
detecting for a lack of synchronization among the plurality of radio links in soft combining based on the measure; and
disabling soft combining when lack of synchronization is detected.

35. An access terminal, comprising:
a receiver; and
a processing system coupled to the receiver to receive transport blocks and configured to:
receive a plurality of sets of transport blocks, each set of transport blocks associated with a radio link from a plurality of radio links in soft combining;
perform a filtering operation to obtain a measure of block errors detected among the plurality of radio links in soft combining;
detect for a lack of synchronization among the plurality of radio links in soft combining based on the measure; and
disable soft combining when lack of synchronization is detected.

* * * * *